Patented Mar. 20, 1923.

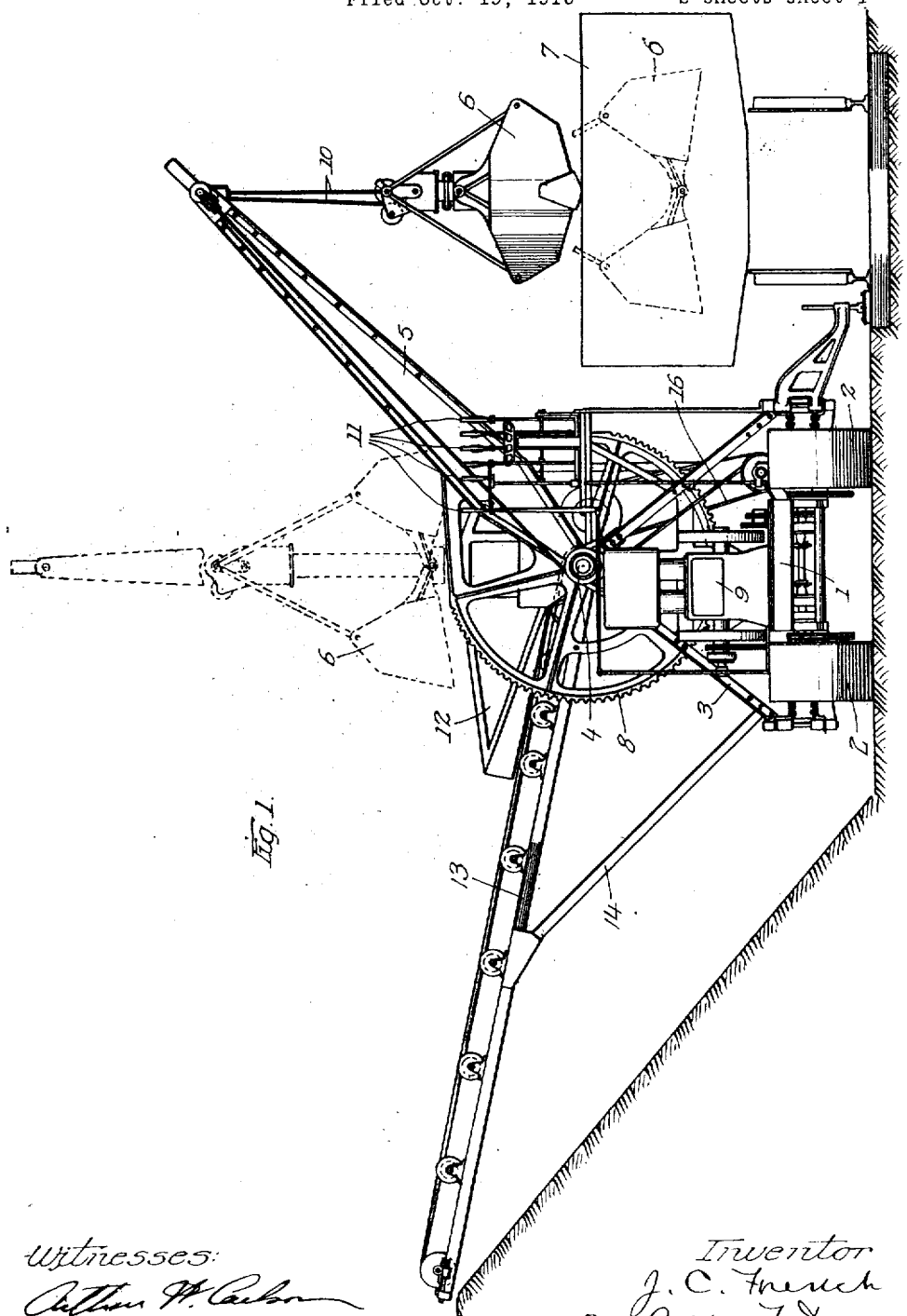

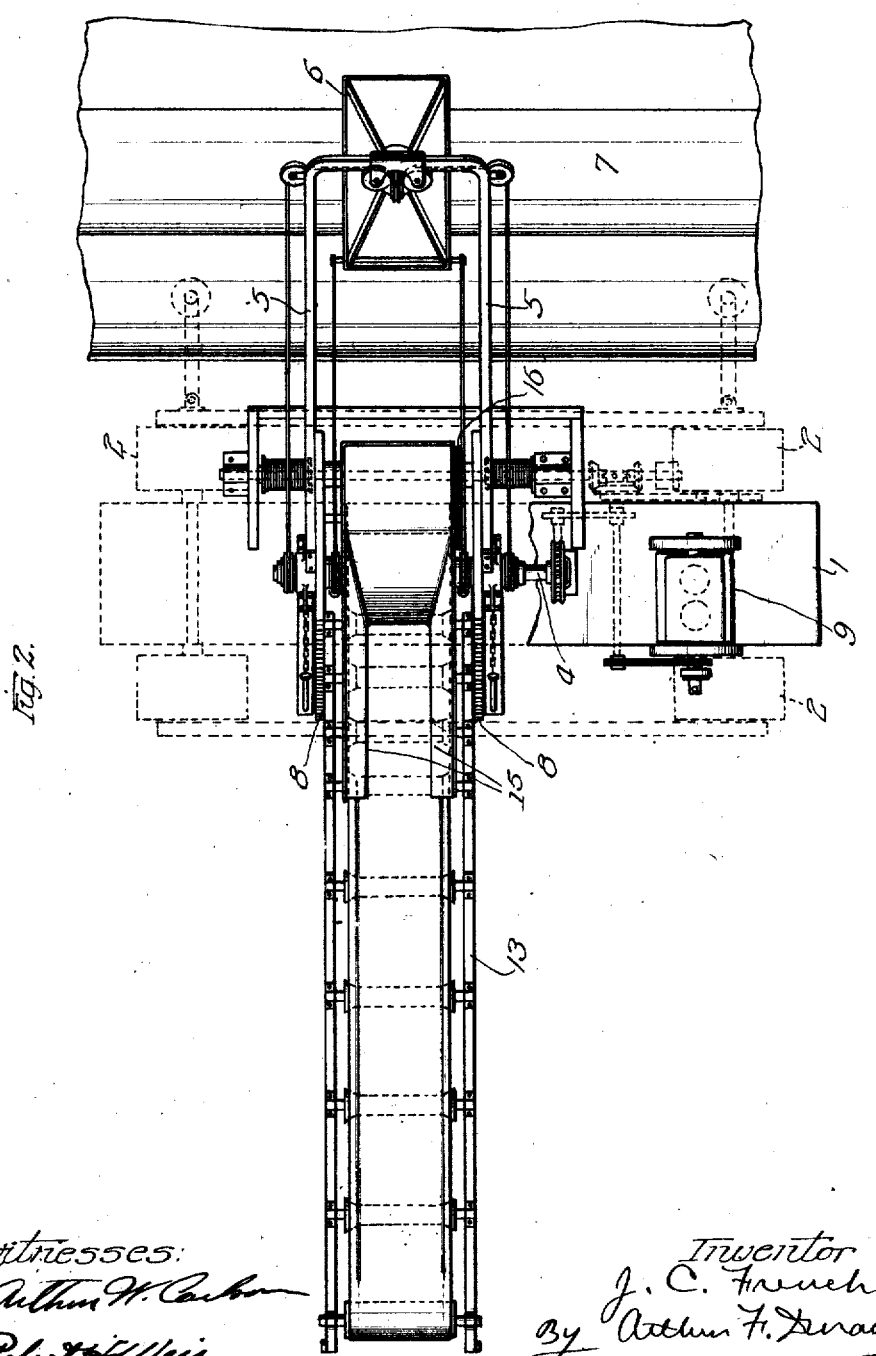

1,448,736

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

CAR UNLOADER.

Application filed October 19, 1918. Serial No. 258,875.

*To all whom it may concern:*

Be it known that I, JAMES C. FRENCH, a citizen of the United States of America, and a resident of Chicago, Illinois, have invented a certain new and useful Improvement in Car Unloaders, of which the following is a specification.

This invention relates to machines for unloading materials from cars, or for similar purposes, such as the one shown in my prior application, No. 190,248, filed September 7, 1917.

The object of the improvements constituting the invention herein shown and described is to provide a novel construction and an arrangement whereby the machine shown in said prior application may be operated without interruption, and in such a manner that the discharge therefrom will be continuous, and whereby the bucket that takes the materials out of the car may work uninterruptedly and without waiting for the materials to be discharged from the hopper, as will more fully appear.

To these and other useful ends the invention consists in matters hereinafter set forth and claimed, and shown in the accompanying drawings, in which—

Fig. 1 is an end elevation of a car unloader involving the principles of the invention; and Fig. 2 is a plan of said machine.

As thus illustrated, the invention comprises a suitable body frame 1 mounted on traction devices 2 of any suitable character, and provided with an upright frame comprising the fixed end members 3 and the longitudinally disposed shaft or arbor 4 mounted in the upper ends thereof. A crane arm 5 of suitable character is supported on said shaft or arbor, so that it swings about a horizontal and longitudinally disposed axis. A clam shell bucket 6 is suitably supported on said crane arm, and is adapted to be lowered into the car 7 to receive a load in a manner that will be readily understood. The crane arm has a pair of gears 8 which are rigid therewith, and which are supported by the shaft or arbor 4, these gears being disposed inside of the fixed frame members 3 previously mentioned. The gears 8 are gear connected in any suitable or desired manner with the engine 9 which is supported on the body frame, and it will be understood that the operation of the crane arm, and also of the cables 10 of the bucket, is completely under the control of the operator or attendant, through the medium, for example, of hand levers 11 having suitable connections extending therefrom to the various elements to be controlled. This is all fully described in said prior application.

The hopper 12 is also mounted on said shaft or arbor 4, and a belt conveyer 13 extends laterally from under said hopper, being also suitably supported on said shaft or arbor, as well as by braces 14 which extend downwardly to the body frame. The hopper 12 has an opening 15 at its outer side, in its inclined bottom wall, so that the materials when discharged into the hopper will then pass through the hopper and onto the conveyer 13, in a manner that will be readily understood. Said conveyer is driven by a driving connection 16, which may be a sprocket chain or belt, and which is suitably connected with the engine 9 previously mentioned. Thus the crane arm 5 is arranged to extend laterally from one side of the car unloader thus constructed, in order to lower the bucket into the car 7, while the conveyer 13 is arranged to extend laterally from the opposite side of the machine, thereby to discharge the materials onto the ground, or into a wagon or other vehicle, at some distance from the hopper 12 which forms the intermediate means of connection between the bucket and the conveyer.

In operation, the bucket is lowered into the car to receive a load, and is then hoisted and swung to a position directly over the hopper 12, and is there operated to discharge its load into the hopper. The materials are discharged by the hopper onto the belt of the conveyer 13, and are by the latter then discharged at a distance from the side of the machine. In this way, the bucket can work uninterruptedly without waiting for the materials to be discharged from the hopper, inasmuch as the latter is always in a position to receive a load from the bucket. The bucket is loaded and discharged and swung back and forth between the car and the hopper without regard to the discharging of the materials at the other side, and at the same time a constant or continuous discharge is effected by the conveyer 13, as this discharge is not interrupted by the intermittent character of the shifting of the materials from the car to the hopper. In other words, if the bucket is worked fast enough to keep the hopper more or less full, the discharge from the outer end of the conveyer will be continuous and uninterrupted. At the same time the arrangement has the advantage, as stated, that the bucket 6 can be kept at work, and can be swung back and forth between the car and the hopper as rapidly as the operator or attendant is capable of handling and controlling the machinery, for the hopper is always in position to receive a load from the bucket.

From the foregoing it will be seen that the load is hoisted at one side of the machine, caused to travel across the machine to a position over the axis of the crane arm, and then travels from the hopper outwardly to the outer end of the conveyer, whereby each load crosses the machine from one side thereof to the other, first by bucket and then by conveyer, in the manner explained. The member which forms the axis of the crane arm serves also as the supporting axis for the inner end of the conveyer, and also supports the hopper, and each load is swung to a point over this axis member before it is discharged into the hopper and onto the receiving end of the conveyer.

What I claim as my invention is:—

1. In a car unloader, a body frame, a crane arm mounted on said body to swing about a horizontal axis, mechanism to operate said arm, a bucket supported on said arm adapted to be lowered into a car to receive a load, a hopper to receive the discharge from the bucket, a conveyer to carry away the discharge from said hopper, and a longitudinal member which forms said axis and upon which said hopper and conveyer are supported, said hopper being stationary and disposed over said axis, and the crane arm and the conveyer projecting from opposite sides of the body frame.

2. In a car unloader, a body frame, a crane arm mounted on said body to swing about a horizontal axis, mechanism to operate said arm, a bucket supported on said arm adapted to be lowered into a car to receive a load, a hopper to receive the discharge from the bucket, and a conveyer to carry away the discharge from said hopper, said mechanism comprising a pair of gears rigidly connected to said crane arm, and means to oscillate said gears about said axis, said hopper and the conveyer being disposed between said gears.

3. In an unloading machine, the combination of a crane arm mounted to swing about a horizontal axis, a bucket suspended from said arm, adapted to take up a load at one side of the machine and to swing back with its load to a position over said body frame, and means including a conveyer arranged to receive the discharge from the bucket and projecting from the other side of said machine, so that the load travels across the machine from one side thereof to the other, above said axis, first by bucket and then by conveyer, and means to operate said crane arm about said axis.

4. In a car unloader, a body frame, a crane arm mounted on said body to swing about a horizontal axis, mechanism to operate said arm, a bucket supported on said arm, adapted to be lowered into a car to receive a load, a hopper to receive the discharge from the bucket, a conveyer to carry away the discharge from said hopper, and a longitudinal member which forms said axis and upon which said hopper and conveyer are supported, said hopper being stationary and disposed over said axis, and the crane arm and the conveyer projecting from opposite sides of the body frame.

5. In a car unloading machine, the combination of a body frame, a crane arm, a member supported on said body frame to form a longitudinal axis for said crane arm, a hoisting bucket carried by said crane arm, so that a load can be taken up at one side of the machine and carried over said axis, a transverse conveyer having its receiving end supported on said axis member and its outer end extending laterally at the other side of said machine, and means to maintain the outer end of the conveyer in suitably elevated position.

6. A structure as specified in claim 5, in combination with a hopper supported on said axis member to ensure the proper transfer of the load from this bucket to said conveyer.

7. A structure as specified in claim 5, said crane arm having lower side portions disposed at opposite sides of said conveyer, in combination with means on said axis member to operate said crane arm.

8. In a car unloader, the combination of a crane arm, means carried thereon for removing the contents of a car, a hopper into which said contents are deposited and from which they may be continuously discharged, a conveyor extending from the hopper to a point of discharge at a distance from the machine and on the side thereof opposite the crane arm, and a member forming a horizontal axis about which said crane arm is adapted to swing to a position above the hopper whereby the material may be delivered from one side of said axis member to said hopper and continuously therefrom by said conveyer to a point at the other side of said member.

Signed.

JAMES C. FRENCH.